(12) United States Patent
Rooney (10) Patent No.: US 7,395,656 B2
(45) Date of Patent: Jul. 8, 2008

(54) DUAL MODE HYBRID ELECTRIC THRUSTER

(75) Inventor: Kevin J. Rooney, West Hills, CA (US)

(73) Assignee: The Boeing Company, Chicago, IL (US)

(*) Notice: Subject to any disclaimer, the term of this patent is extended or adjusted under 35 U.S.C. 154(b) by 536 days.

(21) Appl. No.: 11/050,613

(22) Filed: Jan. 31, 2005

(65) Prior Publication Data

US 2006/0168936 A1 Aug. 3, 2006

(51) Int. Cl.
*F03H 1/00* (2006.01)
(52) U.S. Cl. .......................................... 60/202; 60/204
(58) Field of Classification Search .................. 60/202, 60/204
See application file for complete search history.

(56) References Cited

U.S. PATENT DOCUMENTS

| | | | | |
|---|---|---|---|---|
| 3,232,046 | A | * | 2/1966 | Meyer ........................... 60/202 |
| 3,321,919 | A | * | 5/1967 | Marolda ...................... 376/319 |
| 4,733,530 | A | * | 3/1988 | Beattie et al. ................. 60/202 |
| 4,821,509 | A | * | 4/1989 | Burton et al. ............... 60/203.1 |
| 5,548,953 | A | * | 8/1996 | Hedges et al. ................ 60/202 |
| 5,551,904 | A | | 9/1996 | Hedges et al. |
| 5,924,277 | A | * | 7/1999 | Beattie et al. ................. 60/202 |
| 6,250,070 | B1 | | 6/2001 | Kreiner et al. |
| 6,293,090 | B1 | * | 9/2001 | Olson ........................ 60/203.1 |
| 6,318,069 | B1 | * | 11/2001 | Falce et al. .................... 60/202 |
| 6,334,302 | B1 | | 1/2002 | Chang-Diaz |
| 6,378,290 | B1 | * | 4/2002 | Killinger et al. .............. 60/202 |
| 6,448,721 | B2 | | 9/2002 | Raitses et al. |
| 6,449,941 | B1 | * | 9/2002 | Warboys et al. ............... 60/202 |
| 6,619,028 | B2 | * | 9/2003 | Kreiner et al. ................ 60/202 |
| 6,786,035 | B2 | | 9/2004 | Stickelmaier |
| 6,996,972 | B2 | * | 2/2006 | Song ............................ 60/202 |
| 7,204,078 | B2 | * | 4/2007 | Minick et al. ................. 60/202 |
| 7,246,483 | B2 | * | 7/2007 | Minick et al. ................. 60/204 |
| 2002/0194833 | A1 | * | 12/2002 | Gallimore et al. ............. 60/202 |
| 2005/0257515 | A1 | * | 11/2005 | Song ............................ 60/202 |
| 2006/0218891 | A1 | * | 10/2006 | Roy ........................... 60/203.1 |

OTHER PUBLICATIONS

Domonkos et al., "Thermographic Investigation of 3.2 mm Diameter Orificed Hollow Cathodes," AIAA-98-3793, 34th Joint Propulsion Cleveland, OH, Jul. 12-15, 1998.

* cited by examiner

*Primary Examiner*—William H Rodriguez
(74) *Attorney, Agent, or Firm*—Canady & Lortz LLP; Bradley K. Lortz (57) ABSTRACT

An invention is provided for a dual mode hybrid electric thruster propulsion system. The dual mode hybrid electric thruster provides low thrust using ion/plasma exhaust only, and high thrust by mixing a neutral molecular gas with the ion/plasma exhaust. The dual mode hybrid electric thruster includes a main propellant duct defining a main propellant intake. Coupled to the main propellant duct is an accelerating element, which includes an ionization chamber and an exhaust output. In addition, a momentum exchange zone is located at the exhaust output of the accelerating element. The momentum exchange zone includes a secondary propellant duct defining a secondary propellant intake, which provides a secondary propellant into the momentum exchange zone. In high-thrust mode, the momentum exchange zone exchanges momentum between high velocity ions from the accelerating element with atoms of the secondary propellant.

20 Claims, 6 Drawing Sheets

DUAL MODE HYBRID ELECTRIC THRUSTER

BACKGROUND OF THE INVENTION

1. Field of the Invention

This invention relates generally to propulsion systems and more particularly to a dual mode hybrid electric thruster.

2. Description of the Related Art

Spacecraft such as communications satellites typically utilize electric thrusters for stationkeeping and other functions. Electric thrusters, such as ion thrusters utilize electrical power generated by the solar cells of the satellite to supply energy to a propellant to achieve the propulsion. The ion thruster also has a high specific impulse, making it an efficient engine which requires very little propellant. As a result, ion thrusters require relatively small amounts of a consumable propellant, which is an advantage over using an engine using chemical propellants.

Ion propulsion generally involves employing an ionized gas accelerated electrically across charged grids to develop thrust. The electrically accelerated particles can achieve speeds of approximately 30 km/second. The gas used is typically a noble gas, such as xenon. The principal advantage afforded by ion propulsion systems over conventional chemical propulsion systems is their very high efficiency. For example, with the same amount of fuel mass an ion propulsion system can achieve a final velocity as much as ten times higher than that obtainable with a chemical propulsion system.

Figure 1:
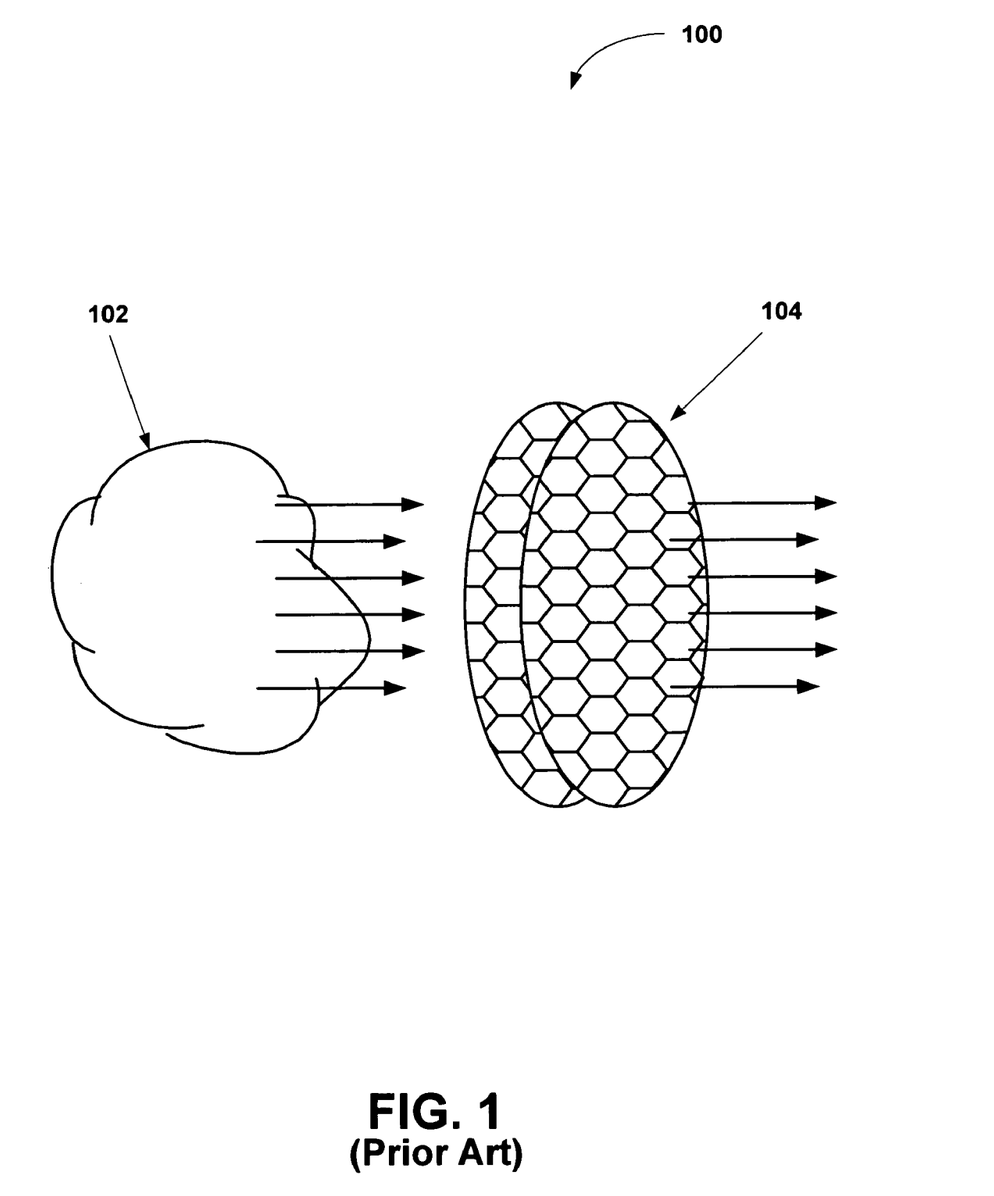
FIG. 1 is a schematic diagram of a prior art ion thruster.

FIG. 1 is a schematic diagram of a prior art ion thruster 100. In operation, ionized gas 102 is accelerated across an ion-optics system 104. The ionized gas 102 is a plasma of ions and electrons that is created and confined within the body of the ion thruster. Ions from the plasma are electrostatically accelerated rearwardly by ion-optics system 104, driving the spacecraft forward in the opposite direction. The ion-optics system 104 includes grids to which appropriate voltages are applied in order to accelerate the ions rearwardly. The grids are in a facing orientation to each other, spaced apart by relatively small clearances such as about 0.035 inches at room temperature. The grids include aligned apertures therethrough. The ions accelerated by the applied voltages pass through the apertures, providing the propulsion.

Ion propulsion is well suited for space applications where low thrust is often acceptable and fuel efficiency is critical. More and more ion propulsion is becoming a component of new spacecraft designs. Spacecraft, including satellites as well as exploration vehicles, are presently making use of ion propulsion systems. For example, ion thrusters are currently used for spacecraft control on some communications satellites. Some existing systems operate by ionizing xenon gas and accelerating it across two or three charged molybdenum grids.

Unfortunately, the range of ion propulsion applications is narrowed by the fact that, although they are efficient, ion propulsion systems develop very low thrust when compared with chemical propulsion systems. Chemical propulsion systems create thrust by thermodynamically expanding heated propellant gas through a nozzle. The energy to heat the propellant is stored in the chemical bonds of the propellant or propellant/oxidiser combination and released through decomposition in single propellant systems or chemical reaction in multi-propellant systems.

Chemical propulsion systems are generally, solid fuel propulsion systems, fluid fuel propulsion systems, or cold gas propulsion systems. Solid fuel propulsion systems provide large amounts of thrust, but cannot be shut off once ignited. The fuel and the catalyst combine to generate high temperatures and pressures. The gaseous fuel then passes through a nozzle and is expelled. The release of the hot gas creates an equal and opposite force pushing the engine forward. Higher combustion temperatures result in greater thrust. A solid fuel engine burns from the inside out, and as a result, the cavity inside the engine is getting larger.

Liquid fuel propulsion systems typically provide less thrust per kilogram of fuel than solid fuel propulsion systems and are much more volatile. Two liquids are combined inside of a combustion chamber and ignited. The resulting gas is expelled through a nozzle. Unlike solid fueled engines, liquid fueled engines can be turned off and on whenever they are needed and the efficiency reduction over the lifetime of the engine is smaller.

Cold gas propulsion systems generally include a single gas and a nozzle. Whenever thrust is needed the nozzle is opened and some of the gas is expelled. Cold gas systems do not produce as much thrust per kilogram of fuel as liquid or solid fueled systems due to the lack of combustion. The thrust and the efficiency rely solely on the pressure in the containment tank. As the cold gas system is used the pressure goes down and so does thrust and efficiency.

Chemical propulsion systems are limited by the available reaction energies and thermal transfer considerations to exhaust gas velocities of a few thousand metres per second. As a result, spacecraft typically use chemical thrusters to provide high thrust at a low $I_{sp}$ for orbit raising and altitude and orbit control subsystems (AOCS). When low thrust is ideal, such as during station/attitude control, spacecraft, when so equipped, employ electric thrusters at a high $I_{sp}$.

Typical missions therefore often utilize spacecraft carrying both thruster types at a cost and mass disadvantage. To avoid the mass disadvantages of carrying low-efficiency fuel for (say) orbit raising from initial transfer/parking orbit to final altitude, one other prior art solution has been to suggest the application of low thrust ion engines to this orbit raising phase, but with compromise in extended periods of transportation (up to several months), with risk of Van Allen belt radiation damage amongst other concerns. Another prior art design has been a two-stage ion thruster which applies two different voltages for ion extraction. This design allows for some level of thrust control, but the resultant increase thrust is very small.

In view of the foregoing, there is a need for a dual mode propulsion system. The system should be throttleable. Thus, the system should provide higher thrust at times needing more rapid motion, such as during orbit raising, and reverting to lower thrust and higher fuel efficiency usage at times when low thrust is ideal, such as during station/attitude control.

SUMMARY OF THE INVENTION

Broadly speaking, embodiments of the present invention address these needs by providing a dual mode hybrid electric thruster propulsion system. The dual mode hybrid electric thruster provides low thrust using ion/plasma exhaust only, and high thrust by mixing a neutral molecular gas with the ion/plasma exhaust. The propulsion system includes a main propellant duct defining a main propellant intake. Coupled to the main propellant duct is an accelerating element, which includes an ionization chamber and an exhaust output. In addition, a momentum exchange zone is located at the exhaust output of the accelerating element. The momentum exchange zone includes a secondary propellant duct defining a secondary propellant intake, which provides a secondary propellant into the momentum exchange zone. In one embodiment, the accelerating element can be an ion thruster that includes a heating element and an ion-optics system to accelerate ions. In another embodiment, the accelerating element can be a Hall effect plasma thrust that includes magnetic windings that produce a magnetic field to accelerate ions. In high-thrust mode, the momentum exchange zone exchanges momentum between high velocity ions from the accelerating element with atoms of the secondary propellant. Optionally, a throttle can be coupled to the secondary duct, which is capable of adjusting the flow rate of the secondary propellant into the momentum exchange zone. The secondary propellant general is a neutral gas, such as xenon, argon, or helium.

In an additional embodiment, a method for providing propulsion is disclosed. The method includes providing a main propellant to an accelerating element having an ionization chamber and an exhaust output. The main propellant is ionized and the ions are accelerated through the exhaust output of the accelerating element. A secondary propellant is provided into a momentum exchange zone located at the exhaust output of the accelerating element, and momentum is exchanged from high velocity ions from the accelerating element to atoms of the secondary propellant. In one embodiment, the accelerating element heats the main propellant and accelerates ions through an ion-optics system. In another embodiment, the accelerating element produces a magnetic field to accelerate ions into the momentum exchange zone. Optionally, the flow rate of the secondary propellant into the momentum exchange zone can be adjusted to adjust thrust.

An additional propulsion system is disclosed in further embodiment of the present invention. The propulsion system includes a means for providing a main propellant to an accelerating element having an ionization chamber and an exhaust output, and means for ionizing the main propellant and accelerating the ions through the exhaust output of the accelerating element. Further, the propulsion system includes a means for providing a secondary propellant into a momentum exchange zone located at the exhaust output of the accelerating element. As above, momentum is exchanged from high velocity ions from the accelerating element to atoms of the secondary propellant. In one embodiment, the accelerating element includes a means for heating the main propellant and an ion-optics means for accelerating ions. In another embodiment, the accelerating element includes a means for producing a magnetic field to accelerate ions into the momentum exchange zone. Optionally, a means for adjusting a flow rate of the secondary propellant into the momentum exchange zone to adjust thrust can be included. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a dual mode hybrid electric thruster. In general, embodiments of the present invention provide low thrust using ion/plasma exhaust only, and high thrust by mixing a neutral molecular gas with the ion/plasma exhaust. The new variable thrust engine can be throttleable linearly in the high thrust mode, while maintaining multistage thrust variation in the low thrust mode.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 2:
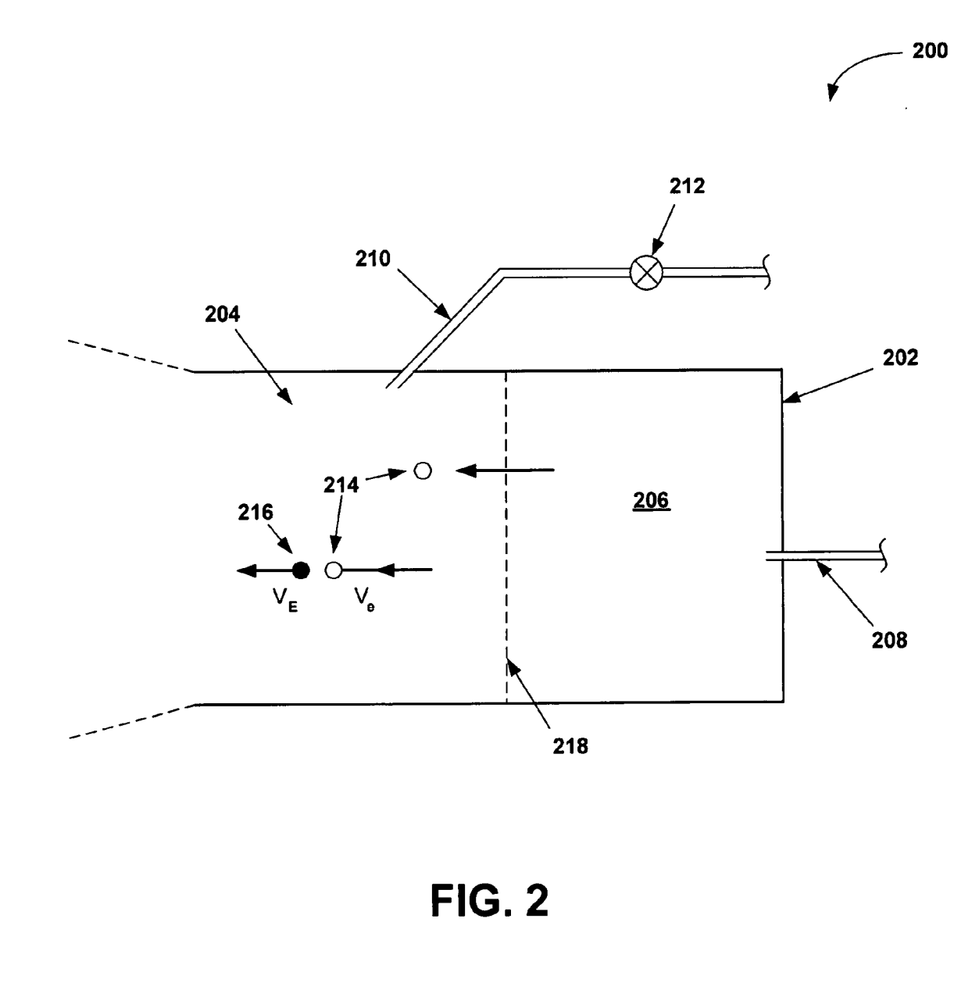
FIG. 2 is a schematic diagram showing a dual mode hybrid electric thruster in accordance with an embodiment of the present invention.

FIG. 1 was described in terms of the prior art. FIG. 2 is a schematic diagram showing a dual mode hybrid electric thruster 200 in accordance with an embodiment of the present invention. The dual mode hybrid electric thruster 200 includes an accelerating element 202, which can be any electric thruster, such as an ion thruster or a Hall effect plasma thruster. A main propellant duct 208 is coupled to the accelerating element 202 and provides a main propellant to an ionization chamber 206 of the accelerating element 202.

Located at the exhaust output 200 of the accelerating element 202, is a momentum exchange zone 204 that includes a secondary propellant duct 210, which provides a secondary propellant into the momentum exchange zone 204. As will be explained in greater detail below, the momentum exchange zone 204 is utilized to increase thrust by exchanging momentum between the high velocity ions from the accelerating element with atoms of the secondary propellant, and by increasing the mass flow rate of the dual mode hybrid thruster 200.

The dual mode hybrid thruster 200 is capable of operating two distinct modes with two regimes of thrust level. The two modes are low thrust mode, using the accelerating element 202 only, and a high thrust mode using both the accelerating element 202 and the momentum exchange zone 204. In low thrust mode, the accelerating element 202 is utilized alone to provide a low thrust at a high $I_{sp}$. In high thrust mode, the secondary propellant duct 210 is used to inject a secondary propellant into the momentum exchange zone 204, as explained in greater detail next with reference to FIG. 3.

Figure 3:
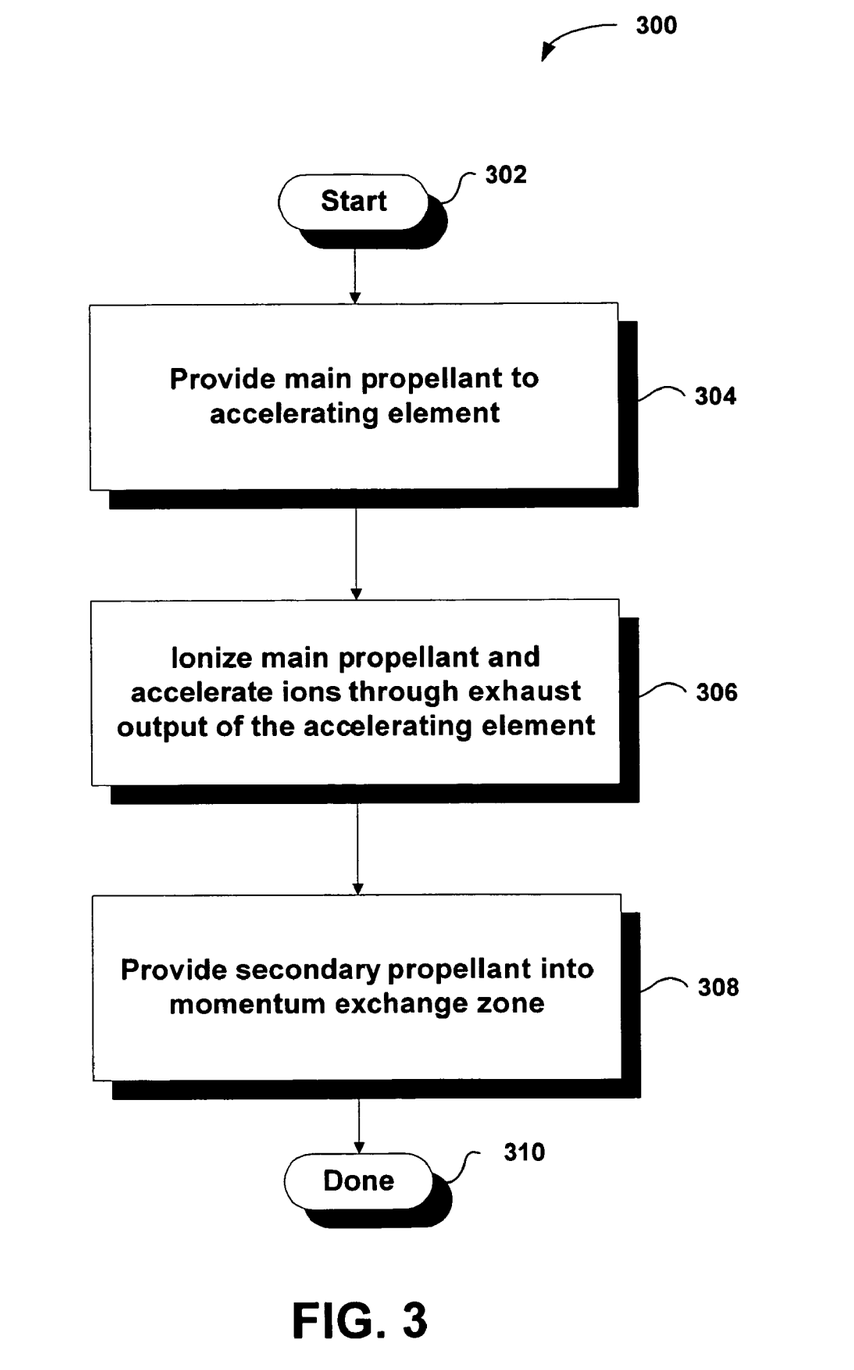
FIG. 3 is a flowchart showing a method for providing high thrust mode propulsion, in accordance with an embodiment of the present invention.

FIG. 3 is a flowchart showing a method 300 for providing high thrust mode propulsion, in accordance with an embodiment of the present invention. In particular, FIG. 3 illustrates how the dual mode hybrid electric thruster 200 of the embodiments of the present invention operates in high thrust mode. In operation 302, preprocess operations are performed. Preprocess operations can include, for example, setting a throttle position for secondary propellant, and other preprocess operations that will be apparent to those skilled in the art after a careful reading of the present disclosure.

In operation 304, main propellant is provided to the accelerating element. Referring back to FIG. 2, the main propellant duct 208 is utilized to provide a neutral gas, such as xenon, to the accelerating element 206. Although xenon is generally utilized as the main propellant, other possible neutral gas alternatives include argon and helium. The main propellant is utilized as fuel for the ionization process, as described next in operation 306.

Turing back to FIG. 3, the main propellant is ionized and the resulting ions are accelerated through the exhaust output of the accelerating element. Referring back to FIG. 2, the accelerating element 202 includes an ionization chamber 206, which is utilized to ionize the main propellant. Once ionized, the ions are accelerating through the exhaust output 218. As mentioned previously, the accelerating element 202 can be any electric thruster such as an ion thruster or a Hall effect plasma thruster.

Figure 4:
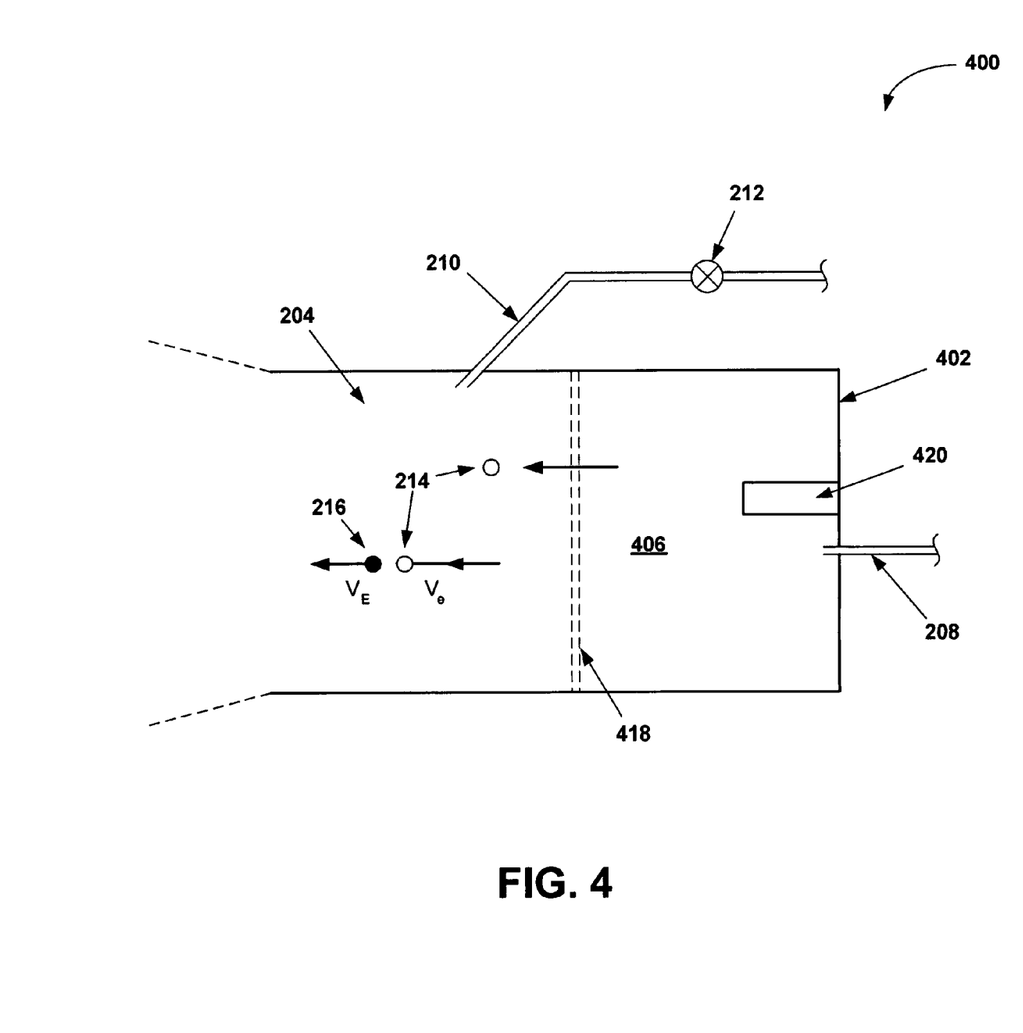
FIG. 4 is a schematic diagram showing a dual mode hybrid electric thruster having an ion thruster as the accelerating element, in accordance with an embodiment of the present invention.

FIG. 4 is a schematic diagram showing a dual mode hybrid electric thruster 400 having an ion thruster 402 as the accelerating element, in accordance with an embodiment of the present invention. The dual mode hybrid electric thruster 400 uses an ion thruster 402 as the accelerating element, which includes a cathode 420, and ionization chamber 406, and an ion-optics system 418 as an exhaust output. As with FIG. 2, the dual mode hybrid electric thruster 400 includes a main propellant duct 208 coupled to the ionization chamber 406 that provides the main propellant to the ionization chamber 206. The momentum exchange zone 204 is located at the exhaust output of the ion thruster 402, that is, after the ion-optics system 418. As above, a secondary propellant duct 210 provides the secondary propellant into the momentum exchange zone 204.

Figure 5:
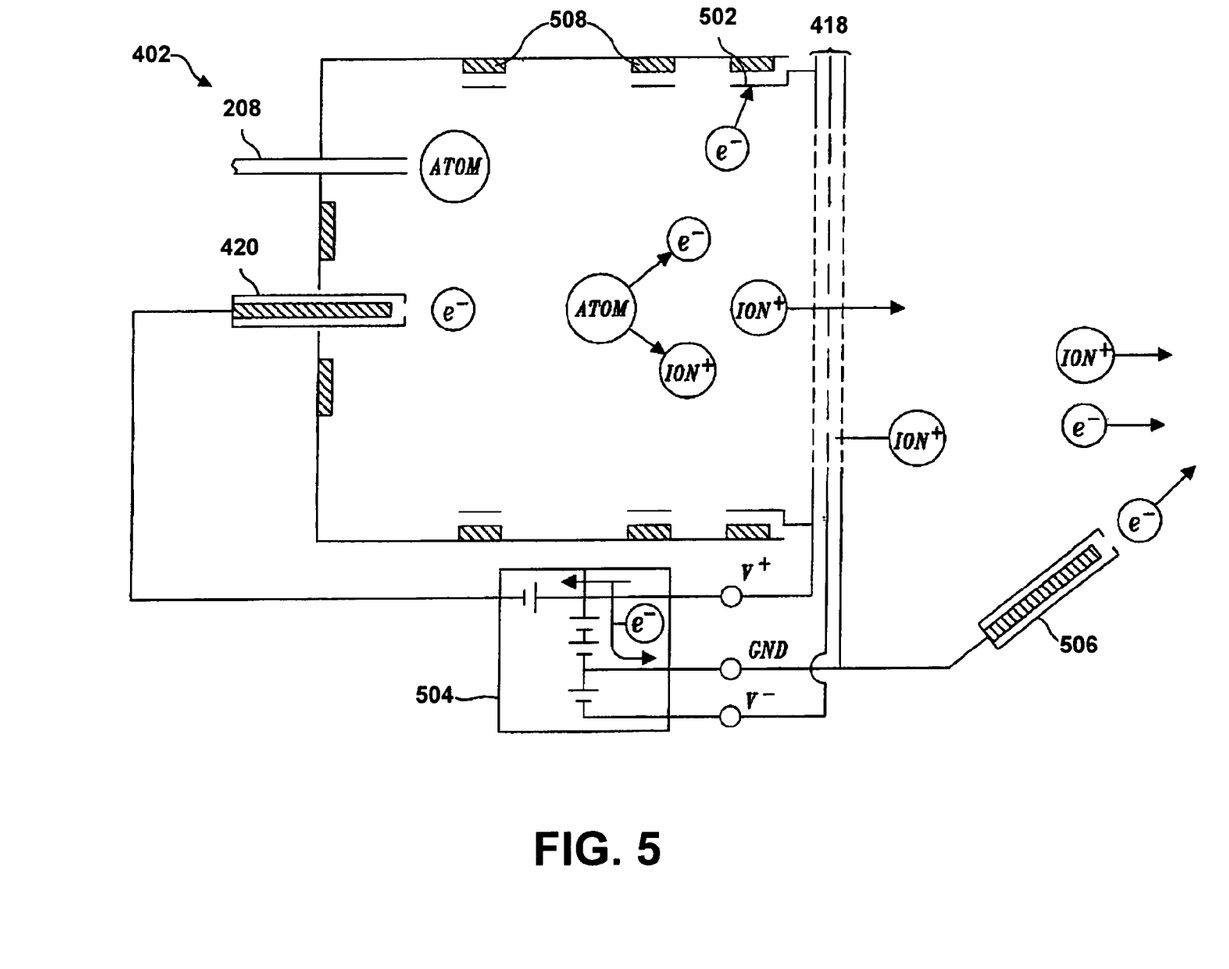
FIG. 5 is a schematic diagram showing an exemplary ion thruster for use in an embodiment of the present invention.

FIG. 5 is a schematic diagram showing an exemplary ion thruster 402 for use in an embodiment of the present invention. The ion thruster 402 includes a cathode 420, a main propellant duct 208, an anode 502, a power supply 504, a neutralizer 506, a magnet 508, and an ion-optics system 418. In operation, cathode 420 produces electrons that strike neutral gas atoms introduced through the propellant duct 208. The electrons ionize the main propellant and produce a diffuse plasma.

The anode 502 raises the positive potential of the resultant plasma. To maintain the positive potential of the anode 502, the power supply 504 pumps to ground potential a plurality of the electrons that the anode collects from the plasma. The neutralizer 506 then ejects these electrons into space to neutralize the ion beam. The magnets 508 act to inhibit electrons and ions from leaving the plasma. Ions drift toward the ion-optics system 418, which includes a screen grid and an accelerator grid, and enter holes in a screen grid.

A voltage difference between the screen grid and an accelerator grid accelerates the ions, thereby creating thrust. The screen grid is at the plasma potential, and the accelerator grid is held at a negative potential to prevent downstream electrons from entering the thruster. Optionally, the ion-optics system 418 can include a decelerator grid located slightly downstream of the accelerator grid and held at ground potential or at a lesser negative potential than the accelerator grid to improve beam focusing and reduce ion impingement on the negative accelerator grid. In addition to using an ion thruster as an accelerating element, embodiments of the present invention can also utilize a Hall effect plasma thruster.

Figure 6:
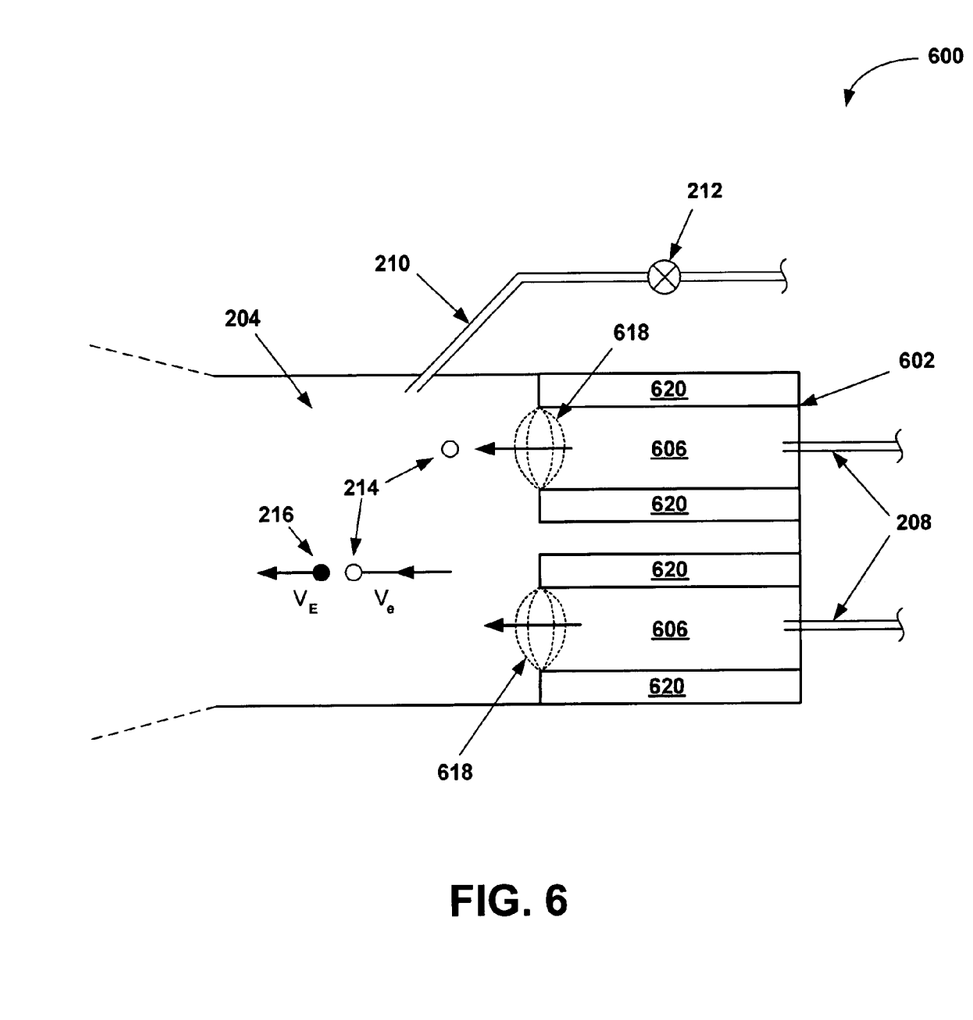
FIG. 6 is a schematic diagram showing a dual mode hybrid electric thruster having a Hall effect plasma thruster as the accelerating element, in accordance with an embodiment of the present invention.

FIG. 6 is a schematic diagram showing a dual mode hybrid electric thruster 600 having a Hall effect plasma thruster 602 as the accelerating element, in accordance with an embodiment of the present invention. The dual mode hybrid electric thruster 600 uses a Hall effect plasma thruster 602 as the accelerating element, which includes an annular ionization chamber 606, a plurality of magnetic windings 620, which form a magnetic field 618 as an exhaust output. As with FIG. 2, the dual mode hybrid electric thruster 600 includes one or more main propellant ducts 208 coupled to the annular ionization chamber 606 that provides the main propellant to the annular ionization chamber 606. The momentum exchange zone 204 is located at the exhaust output of the Hall effect plasma thruster 602, that is, after the magnetic fields 418. As above, a secondary propellant duct 210 provides the secondary propellant into the momentum exchange zone 204.

In the Hall effect plasma thruster 602, the main propellant is ionized and accelerated by an electric field. An electron current passing through and being impeded by a magnetic field establishes the acceleration field. The electrons in this magnetic field follow a closed drift path, which is perpendicular to both the applied magnetic field and the current flow in the plasma. The drift path is due to the Hall effect.

In general, a radial magnetic field is established in the annular ionization chamber 606 between an inner, cylindrical ferromagnetic pole piece and an outer, ferromagnetic ring. The chamber 606 is closed at one end, where an annular anode is situated. The other end of the chamber is open and forms the exit path for the accelerated ions. Outside the chamber, beyond the exit for the ion stream, is an external cathode. As the electrons emitted by the cathode move towards the anode under the influence of the applied electric field, the radial magnetic field results in a force acting on them in a direction perpendicular to the plane containing the two fields, which causes them to drift in an azimuthal direction. This azimuthal drift results in a Hall current and impedes the progress of the electrons towards the anode.

Turning back to FIG. 3, a secondary propellant is injected into the momentum exchange zone, in operation 308. As mentioned previously, embodiments of the present invention provide high thrust by mixing a neutral molecular gas with the ion/plasma exhaust from the accelerating element. The selection of a specific molecular species as a secondary propellant which may add to the exhaust energy by means of ion-induced exothermic molecular bond disassociation, the subsequent products of which could be suitably collimated, would provide even further exhaust momentum. The new variable thrust engine can be throttleable linearly in the high thrust mode, while maintaining multi-stage thrust variation in the low thrust mode.

Referring to FIG. 2, the momentum exchange zone 204 is utilized to increase thrust by exchanging momentum between the high velocity ions from the accelerating element 402 with atoms of the secondary propellant. In this manner, the dual mode hybrid thruster 200 is capable of operating two distinct modes with two regimes of thrust level. The two modes are low thrust mode, using the accelerating element 202 only, and a high-thrust mode using both the accelerating element 202 and the momentum exchange zone 204. As described above, in low thrust mode, the accelerating element 202 is utilized alone to provide a low-thrust at a high $I_{sp}$.

However, in high thrust mode, the secondary propellant duct 210 is used to inject a secondary propellant into the momentum exchange zone 204. The flow rate of the secondary propellant can be adjusted utilizing the throttle 212. In this manner, the dual mode hybrid thruster 200 is throttleable linearly in the high-thrust mode, while maintaining multi-stage thrust variation in the low-thrust mode.

As shown in FIG. 2, in high-thrust mode a secondary propellant, typically a neutral gas such as xenon, is injected into the momentum exchange zone 204 via the secondary propellant duct 210. At the same time, ions 214 from the ionization chamber 206 enter the momentum exchange zone 204 at a very high velocity through the exhaust output 218 of the accelerating element 202. The high velocity ions 214 collide with the atoms 216 of the secondary propellant, resulting in a momentum exchange between the high velocity ions 214 and the secondary propellant atoms 216. The momentum exchange decelerates the ions 214 and accelerates the secondary propellant atoms 216, resulting in increased thrust. Preferably, a propellant confinement element is utilized to increase efficiency of the momentum exchange. As can appreciated, the propellant confinement element can be either mechanical, electromagnetic, or a combination thereof.

The thrust level is controllable in the high-thrust mode by controlling the volume flow using the throttle 212. Hence, to revert to the high efficiency low-thrust mode, the throttle 212 is used to turn off the flow of the secondary propellant to the momentum exchange zone 204, resulting in the accelerating element 202 being used alone to provide thrust.

Turning back to FIG. 3, post process operations are performed in operation 310. Post process operations can include, for example, returning to low-thrust mode by throttling off the secondary propellant, increasing thrust by increasing secondary propellant flow, and other post process operations that will be apparent to those skilled in the art after a careful reading of the present disclosure.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A propulsion system comprising:
   a main propellant duct defining a main propellant intake for providing a main propellant;
   an accelerating element coupled to the main propellant duct, the accelerating element having an ionization chamber for ionizing the main propellant and an exhaust output for high velocity ions of the main propellant from the accelerating element; and
   a momentum exchange zone located at the exhaust output of the accelerating element, the momentum exchange zone having a secondary propellant duct defining a secondary propellant intake, wherein the secondary propellant duct provides a secondary propellant into the momentum exchange zone where momentum is exchanged from the high velocity ions from the accelerating element to atoms of the secondary propellant.

2. A propulsion system as recited in claim 1, wherein the accelerating element includes a heating element and an ion-optics system to accelerate ions.

3. A propulsion system as recited in claim 1, wherein the accelerating element includes magnetic windings which produce a magnetic field to accelerate ions.

4. A propulsion system as recited in claim 1, wherein the momentum exchange zone exchanges momentum between high velocity ions from the accelerating element with atoms of the secondary propellant.

5. A propulsion system as recited in claim 1, further comprising a throttle coupled to the secondary duct, the throttle capable of adjusting a flow rate of the secondary propellant into the momentum exchange zone.

6. A propulsion system as recited in claim 1, wherein the secondary propellant is a neutral gas.

7. A propulsion system as recited in claim 6, wherein the neutral gas is xenon.

8. A method for providing propulsion comprising the operations of:
   providing a main propellant to an accelerating element having an ionization chamber and an exhaust output;
   ionizing the main propellant and accelerating the ions through the exhaust output of the accelerating element; and
   providing a secondary propellant into a momentum exchange zone located at the exhaust output of the accelerating element, wherein momentum is exchanged from high velocity ions from the accelerating element to atoms of the secondary propellant.

9. A method as recited in claim 8, wherein the accelerating element heats the main propellant and accelerates ions through an ion-optics system.

10. A method as recited in claim 8, wherein the accelerating element produces a magnetic field to accelerate ions into the momentum exchange zone.

11. A method as recited in claim 8, further comprising the operation of adjusting a flow rate of the secondary propellant into the momentum exchange zone to adjust thrust.

12. A method as recited in claim 8, wherein the secondary propellant is a neutral gas.

13. A method as recited in claim 12, wherein the neutral gas is xenon.

14. A propulsion system comprising:
   means for providing a main propellant to an accelerating element having an ionization chamber and an exhaust output;
   means for ionizing the main propellant and accelerating the ions through the exhaust output of the accelerating element; and
   means for providing a secondary propellant into a momentum exchange zone located at the exhaust output of the accelerating element, wherein momentum is exchanged from high velocity ions from the accelerating element to atoms of the secondary propellant.

15. A propulsion system as recited in claim 14, wherein the accelerating element includes a means for heating the main propellant and an ion-optics means for accelerating ions.

16. A propulsion system as recited in claim 14, wherein the accelerating element includes a means for producing a magnetic field to accelerate ions into the momentum exchange zone.

17. A propulsion system as recited in claim 14, further comprising a means for adjusting a flow rate of the secondary propellant into the momentum exchange zone to adjust thrust.

18. A propulsion system as recited in claim 14, wherein the secondary propellant is a neutral gas.

19. A propulsion system as recited in claim 18, wherein the neutral gas is xenon.

20. A propulsion system as recited in claim 18, wherein the neutral gas is argon.

* * * * *